*T. Shaw,*
*Blow-Off Cock,*
*Nº 36,238.*   *Patented Aug. 19, 1862.*
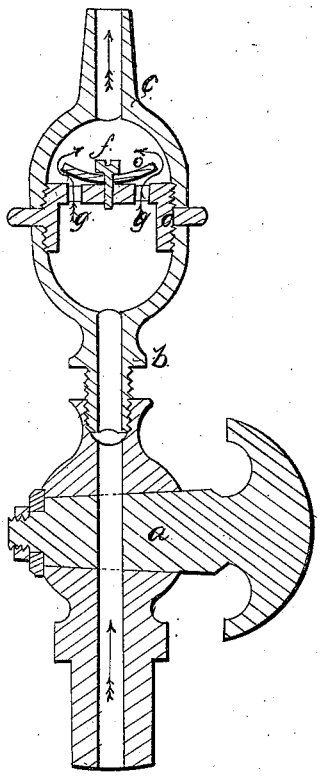
Witnesses:
Elias J. Shaw
John White
Inventor:
Thomas Shaw

UNITED STATES PATENT OFFICE.

THOMAS SHAW, OF PHILADELPHIA, PENNSYLVANIA.

IMPROVEMENT IN BLOW-OFF COCKS FOR PUMPS.

Specification forming part of Letters Patent No. 36,238, dated August 19, 1862.

*To all whom it may concern:*

Be it known that I, THOMAS SHAW, of the city and county of Philadelphia and State of Pennsylvania, have invented a new and Improved Blow-Off Cock for Pumps; and I hereby declare the following to be a full, clear, and exact description of the same, reference being had to the accompanying drawing, and to the letters of reference marked thereon.

My invention consists in the application of a valve to the ordinary blow-off cock.

In order to enable others to practice my invention, I will proceed to describe its construction and operation.

The accompanying drawing, which forms a part of this specification, represents a longitudinal section through the center, of which $a$ is an ordinary blow-off cock, to which is connected the chamber $d$. Said chamber is formed by means of cups $b$ and $c$, screwed upon the partition $d$. The partition $d$ has small holes, $g$, surrounding the center $f$. Said holes are covered with a disk of flexible material, $e$, as india-rubber, which is secured in the partition $d$ by means of screw $f$, said disk forming, in combination with said holes, a valve for the egress of air, water, &c., in the direction represented by the arrows, and for the further purpose of preventing the return of the same.

It will be evident that valves of other shapes than the one represented could be easily substituted without altering the result. I therefore do not wish to confine myself to the exact shape and position of the valve.

What I claim, and desire to secure by Letters Patent, is—

The combination of a valve and faucet when applied to a pump, substantially as shown and described.

THOMAS SHAW.

Witnesses:
  C. BRAZER,
  W. P. BRAZER.